United States Patent
Liu

(10) Patent No.: US 11,233,933 B2
(45) Date of Patent: Jan. 25, 2022

(54) METHOD AND DEVICE FOR PROCESSING IMAGE, AND MOBILE TERMINAL

(71) Applicant: GUANGDONG OPPO MOBILE TELECOMMUNICATIONS CORP., LTD., Guangdong (CN)

(72) Inventor: Yaoyong Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 206 days.

(21) Appl. No.: 16/506,175

(22) Filed: Jul. 9, 2019

(65) Prior Publication Data

US 2020/0021733 A1 Jan. 16, 2020

(30) Foreign Application Priority Data

Jul. 16, 2018 (CN) .......................... 201810777660.9

(51) Int. Cl.
*H04N 5/232* (2006.01)

(52) U.S. Cl.
CPC ..... *H04N 5/23216* (2013.01); *H04N 5/23229* (2013.01); *H04N 5/232935* (2018.08)

(58) Field of Classification Search
CPC ............ G06K 9/6202; G06K 9/00664; G06K 9/6267; H04N 5/23216; H04N 5/23229; H04N 5/23222; H04N 5/2254; H04N 5/23293; G06F 3/016; G02B 7/02
See application file for complete search history.

(56) References Cited

U.S. PATENT DOCUMENTS

| 9,092,700 B2 | 7/2015 | Wang et al. |
| 2010/0290705 A1 | 11/2010 | Nakamura |
| 2010/0329552 A1 | 12/2010 | Yim et al. |
| 2013/0148854 A1 | 6/2013 | Wang et al. |
| 2013/0272611 A1 | 10/2013 | Nakamura et al. |
| 2015/0010239 A1* | 1/2015 | He ..................... G06K 9/00664 382/203 |
| 2015/0036921 A1 | 2/2015 | Lu et al. |
| 2015/0269455 A1 | 9/2015 | He et al. |
| 2017/0177974 A1 | 6/2017 | He et al. |

(Continued)

FOREIGN PATENT DOCUMENTS

| CN | 101843093 A | 9/2010 |
| CN | 103945113 A | 7/2014 |
| CN | 103945129 A | 7/2014 |

(Continued)

OTHER PUBLICATIONS

Bappy Jawadul Hasan et al: "Inter-dependent CNNs for joint scene and object recognition", 2016 23rd International Conference on Pattern Recognition (ICPR), IEEE, Dec. 4, 2016 (Dec. 4, 2016), pp. 3386-3391, XP033086101, the whote document.

(Continued)

*Primary Examiner* — Xi Wang

(57) ABSTRACT

A method for processing an image is provided. The method includes that: a preview image to be processed is acquired; scene information is identified from the preview image; a composition mode corresponding to the scene information is determined; and the preview image is composed according to the composition mode. A device for processing an image and a mobile terminal are also provided.

15 Claims, 8 Drawing Sheets

(56) References Cited

U.S. PATENT DOCUMENTS

| | | |
|---|---|---|
| 2017/0374246 A1 | 12/2017 | Wang |
| 2018/0032840 A1 | 2/2018 | Yu et al. |

FOREIGN PATENT DOCUMENTS

| | | | |
|---|---|---|---|
| CN | 105991925 A | 10/2016 | |
| CN | 106131418 A | 11/2016 | |
| CN | 106295678 A | 1/2017 | |
| CN | 106998389 A | 8/2017 | |
| CN | 107257439 A | 10/2017 | |
| CN | 107818313 A | 3/2018 | |
| CN | 107835364 A | 3/2018 | |
| CN | 108810418 A | 11/2018 | |
| EP | 2207341 A1 | 7/2010 | |
| EP | 3654625 A1 | 5/2020 | |

OTHER PUBLICATIONS

Extended European Search Report; Appln. No. 19184943.9, dated Nov. 13, 2019.
International Search Report in the international application No. PCT/CN2019/095321, dated Sep. 29, 2019.
Written Opinion of the International Search Authority in the international application No. PCT/CN2019/095321, dated Sep. 30, 2019.
First Office Action of Chinese application No. 201810777660.9, dated Aug. 26, 2019.
First Office Action of the European application No. 19184943.9, dated Dec. 9, 2020.
Office Action of the Indian application No. 201914028293, dated Oct. 20, 2020.
Second Office Action of the Chinese application No. 201810777660.9, dated Jan. 9, 2020.
Second Office Action of the European application No. 19184943.9, dated Aug. 16, 2021.

* cited by examiner

METHOD AND DEVICE FOR PROCESSING IMAGE, AND MOBILE TERMINAL

CROSS-REFERENCE TO RELATED APPLICATION

This application claims priority to Chinese Patent Application No. 201810777660.9, entitled "METHOD AND APPARATUS FOR PROCESSING IMAGE, MOBILE TERMINAL, AND COMPUTER-READABLE STORAGE MEDIUM", filed on Jul. 16, 2018, the disclosure of which is hereby incorporated by reference in its entirety.

TECHNICAL FIELD

The present disclosure relates to the field of computer applications, and in particular to a method and device for processing an image, and a mobile terminal.

BACKGROUND

Nowadays, almost all smart mobile terminals are equipped with a camera. However, users without professional photography skills generally cannot take high-ornamental value photos due to improper composition or camera settings.

BRIEF DESCRIPTION OF DRAWINGS

In order to describe technical solutions in the embodiments of the present disclosure or in the related technology more clearly, the drawings to be used in descriptions about the embodiments or the related technology will be simply introduced below. It is apparent that the drawings merely illustrate some of the embodiments of the present disclosure. Those of ordinary skilled in the art may further obtain other drawings according to these drawings without creative work.

DETAILED DESCRIPTION

In order to make the objectives, technical solutions and advantages of the present disclosure clearer, the present disclosure will be further elaborated below in conjunction with the drawings and the embodiments. It will be appreciated that specific embodiments described here are only used to explain the present disclosure, and not intended to limit the present disclosure.

Figure 1:
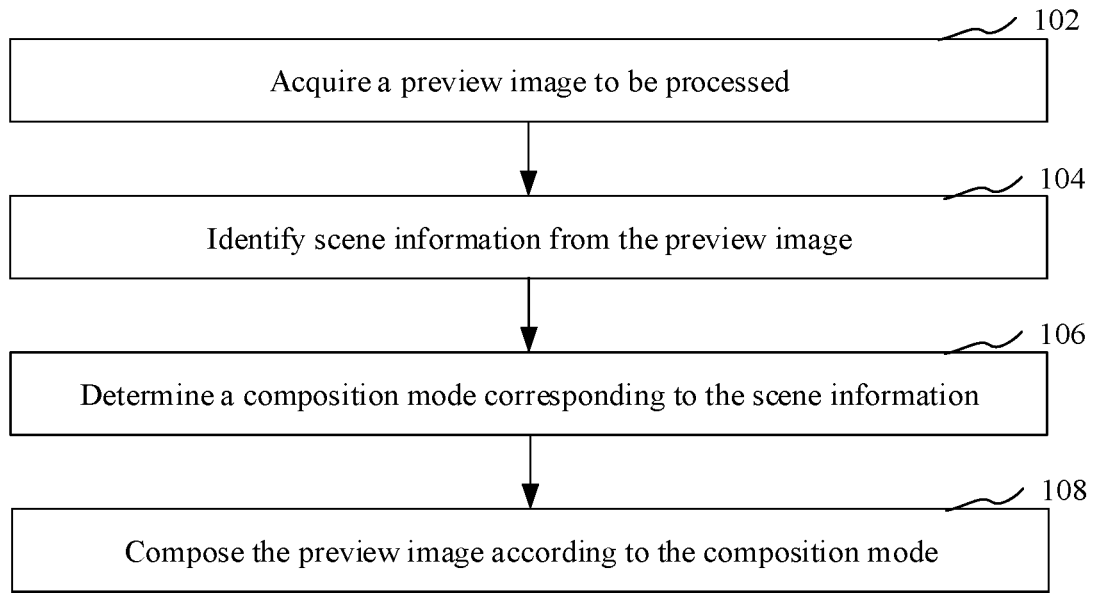
FIG. 1 illustrates a flowchart of a method for processing an image according to an embodiment.

FIG. 1 illustrates a flowchart of a method for processing an image according to an embodiment. As illustrated in FIG. 1, the method for processing image includes operations illustrated in blocks 102 to 108.

At block 102, a preview image to be processed is acquired.

In the present embodiment, the preview image to be processed may include multiple consecutive frames of preview images. The multiple consecutive frames of preview images may be two or more consecutive frames of preview images. The multiple consecutive frames of preview images may be multiple frames of preview images captured by a camera of a computer device within a preset time. For example, if the camera of the computer device captures three frames of preview images within 0.1 seconds, the three frames of preview images may be used as the multiple consecutive frames of preview images.

In an embodiment, the computer device is further provided with multiple preview windows, each of which presents a respective frame of preview image.

At block 104, scene information is identified from the preview image.

In the present embodiment, scene information is identified from the preview image based on a neural network. It will be appreciated that the neural network may be a convolutional neural network (CNN). CNN is a neural network model developed for image classification and recognition based on a traditional multi-layer neural network. Compared with the traditional multi-layer neural network, the CNN introduces a convolution algorithm and a pooling algorithm. The convolution algorithm is a mathematical algorithm for performing a weighted superposition on data in a local region. The pooling algorithm is a mathematical algorithm for sampling data in a local region.

Figure 2:
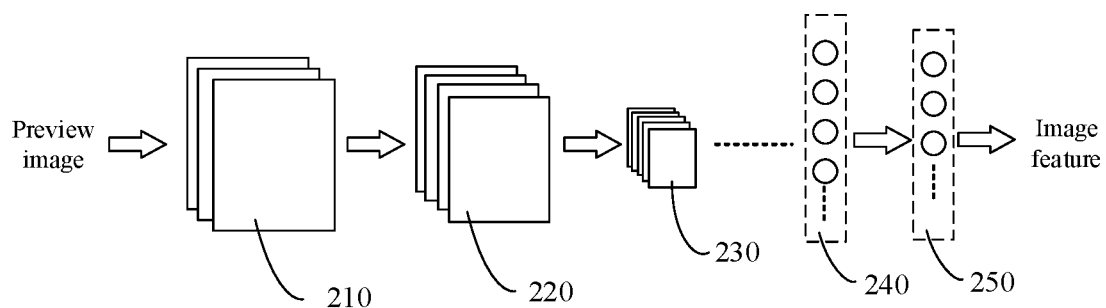
FIG. 2 illustrates an architecture diagram of a neural network according to an embodiment.

Specifically, a CNN model consists of alternative convolution layers and pooling layers. As illustrated in FIG. 2, a preview image is input at an input layer 210, an image feature extraction is performed at a convolution layer 220 on each local region of the image input at the input layer, and image features extracted at the convolutional layer are sampled at a pooling layer 230 to reduce the number of dimensions, and then the sampled image features are connected together at a number of fully connected layers 240, and final extracted features are output at a last hidden layer 250. Scene information is identified based on the final extracted features. The scene information includes background category information and foreground object category information. Herein, the background category information may include information related to a category of a background region of the preview image, which indicates which category the background region of the preview image belongs to. The background region may be classified into the following categories: landscape, beach, snow, blue sky, green space, night scene, darkness, backlight, sunrise/sunset, indoor, fireworks, spotlights, etc. The foreground object category information may include information related to a category of a foreground object of the preview image, which indicates which category the foreground object of the preview image belongs to. The foreground objects may be portraits, babies, cats, dogs, foods, etc.

In an embodiment, a softmax analyzer is configured after the last hidden layer 250 of the CNN, and the final extracted features are analyzed via the softmax analyzer to obtain the probability of a category corresponding to a background in the image and the probability of a category corresponding to a foreground object.

Before identifying the background category and the foreground object of the preview image using a neural network, the neural network needs to be trained. The training process may include the following operations.

First, a training image including at least one background training object (including landscape, beach, snow, blue sky, green space, night scene, darkness, backlight, sunrise/sunset, indoor, fireworks, spotlights, etc.) and at least one foreground training object (including main objects: portraits, babies, cats, dogs, foods, etc.) is input into the neural network. The neural network performs feature extraction according to the background training object and the foreground training object. For example, features may be extracted using scale-invariant feature transform (SIFT) features and histogram of oriented gradient (HOG) features. The background training object is then detected according to an object detection algorithm such as a single shot multibox detector (SSD) or a visual geometry group (VGG) to obtain a first prediction confidence. The foreground training object is detected according to the above object detection algorithm to obtain a second prediction confidence. The first prediction confidence is a degree of confidence that a pixel of a background region in the training image predicted using the neural network belongs to the background training object. The second prediction confidence is a degree of confidence that a pixel of a foreground region in the training image predicted using the neural network belongs to the foreground training object. The background training object and the foreground training object may be pre-labeled in the training image to obtain a first real confidence and a second real confidence. The first real confidence represents a degree of confidence that the pixel pre-labeled in the training image belongs to the background training object. The second real confidence represents a degree of confidence that the pixel pre-labeled in the training image belongs to the foreground training object. For each pixel in the image, the real confidence may be expressed as 1 (or positive) to indicate that the pixel belongs to a training object, or 0 (or negative) to indicate that the pixel does not belong to the training object.

Secondly, a difference between the first prediction confidence and the first real confidence is calculated to obtain a first loss function, and a difference between the second prediction confidence and the second real confidence is calculated to obtain a second loss function. Each the first loss function and the second loss function may be in a form of a logarithmic function, a hyperbolic function, an absolute value function, and the like.

Finally, the first loss function and the second loss function are weighted and summed to obtain an objective loss function, and the parameters of the neural network are adjusted according to the objective loss function to realize the training on the neural network.

Figure 3:
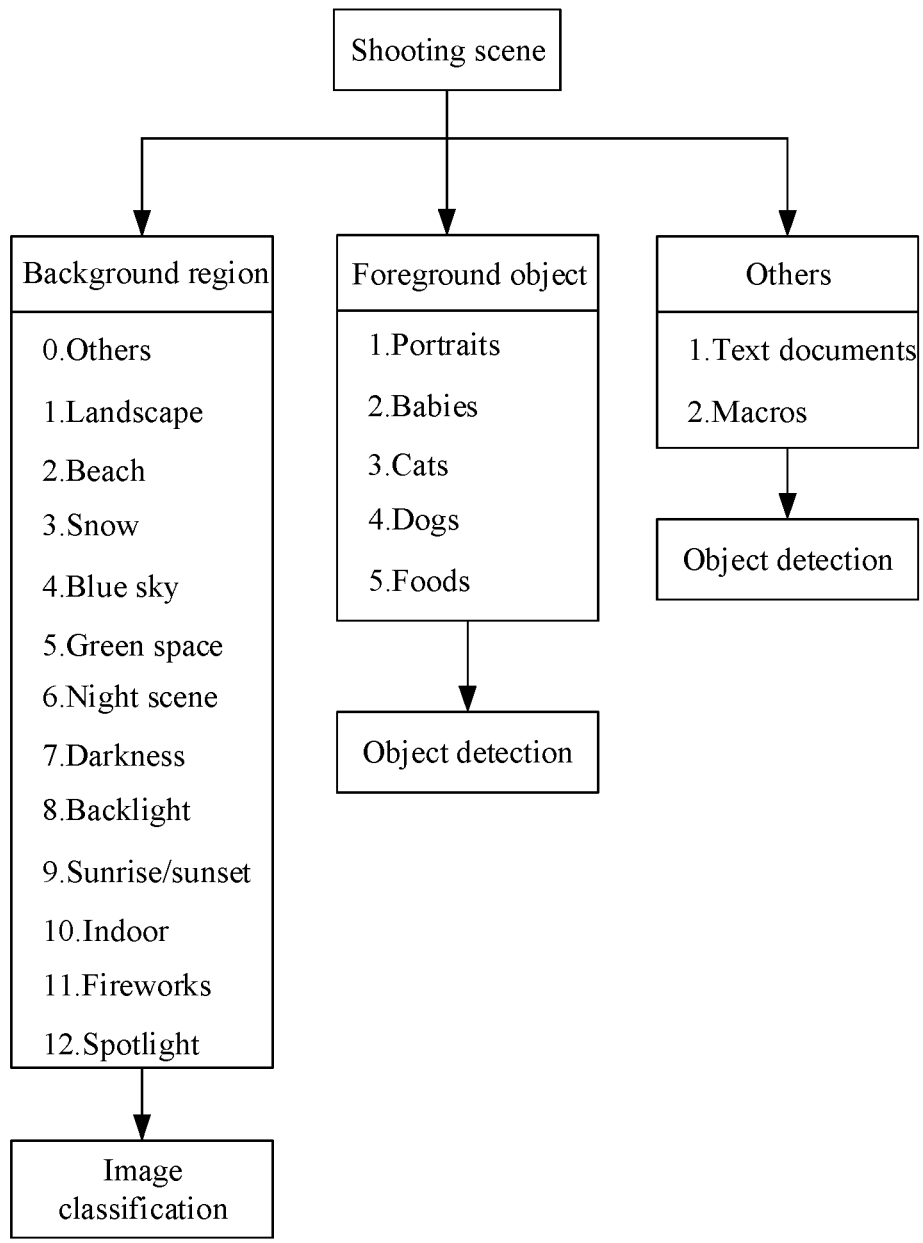
FIG. 3 illustrates a diagram of categories of shooting scenes according to an embodiment.

In an embodiment, as illustrated in FIG. 3, the shooting scene of the training image may include a category of the background region, one or more foreground objects, and others. The background region may be classified into the following categories: landscape, beach, snow, blue sky, green space, night scene, darkness, backlight, sunrise/sunset, indoor, fireworks, spotlights, etc. The foreground objects may be portraits, babies, cats, dogs, foods, etc. Others may be text documents, macros, etc.

At block 106, a composition mode corresponding to the scene information is determined.

In an embodiment, the scene information includes background category information and foreground object category information. The background category information includes landscape, beach, snow, blue sky, green space, night scene, darkness, backlight, sunrise/sunset, indoor, fireworks, spotlights, etc. The foreground object category information includes portraits, babies, cats, dogs, foods, etc.

In an embodiment, the composition mode includes a nine-square lattice composition, a cross-shaped composition, a triangular composition, a diagonal composition, etc.

Specifically, at least one composition mode for multiple pieces of scene information is pre-stored in the computer device, and each piece of scene information corresponds to a respective composition mode. After determining the scene information of the preview image, the computer device calls the composition mode corresponding to the scene information. For example, when the scene information is landscape plus portrait (i.e., the background category information is landscape, and the foreground object category information is a portrait), the computer device may call the nine-square lattice composition mode to make the portrait at a golden section position in the preview image. When the scene information is landscape plus food (i.e., the background category information is landscape, and the foreground object category information is food), the computer device may call the triangular composition mode to highlight the foreground object, i.e., the food.

In an embodiment, for a same piece of scene information, multiple composition modes may be provided. For example, the scene information of landscape plus portrait may correspond to the nine-square lattice composition mode, and may also correspond to the triangular composition mode. Specifically, the final composition mode may be selected based on the foreground object category information. For example, in the scene information of landscape plus portrait, if there are a large number (three or more) of portraits, the nine-square lattice composition mode may be selected to make each portrait at a display position required by the nine-square lattice composition mode; and if there is only one portrait, the triangular composition mode may be selected to highlight the portrait.

At block 108, the preview image is composed according to the composition mode.

In the present embodiment, different pieces of scene information correspond to the same or different composition modes. Different compositions of the preview image may be implemented according to different composition modes. For example, the composition mode includes a nine-square lattice composition, a cross-shaped composition, a triangular composition, a diagonal composition, etc. The nine-square lattice composition mode is a form of golden section. That is, the preview image is equally divided into nine blocks, and a main object may be arranged on any one of four corners of the center block. The cross-shaped composition is implemented by dividing the preview image into four blocks with a horizontal line and a vertical line passing through a center of the preview image. A main object may be arranged at an intersection of the horizontal and vertical lines, that is, at the center of the preview image. The triangular composition is implemented by arranging a main object at a center of preview image and placing the main object into a triangle block. The diagonal composition is implemented by arranging the main object (for example, bridge, character, car, etc.) on a diagonal of the preview image.

Different composition modes corresponding to different pieces of scene information are pre-stored in the computer device, and the preview image is composed based on the detected scene information and the composition mode corresponding to the detected scene information.

According to the above image processing method, a preview image to be processed is acquired; scene information is identified from the preview image; a composition mode corresponding to the scene information is determined; and the preview image is composed according to the composition mode. In such a manner, the scene information of the preview image can be automatically identified, and each piece of scene information can be matched automatically with one or more respective composition modes, so that a subsequent shooting adjustment prompt for the preview image is provided based on scene information and the corresponding composition mode, and the processed image has a higher ornamental value.

In an embodiment, the image processing method further includes that: the composed preview images are presented respectively using multiple preview windows. Specifically, multiple preview windows presenting images are provided in a screen of the computer device, and each of which is for presenting one frame of preview image. More specifically, each of the multiple preview windows presents a respective frame of preview image. In an embodiment, the preview images adopt different composition modes, each frame of preview image is presented on a preview window after the composition process, and a user can compare the composition effects of the preview images based on the image presented in each preview window, and store one frame of preview image according to the comparison result.

Figure 4:
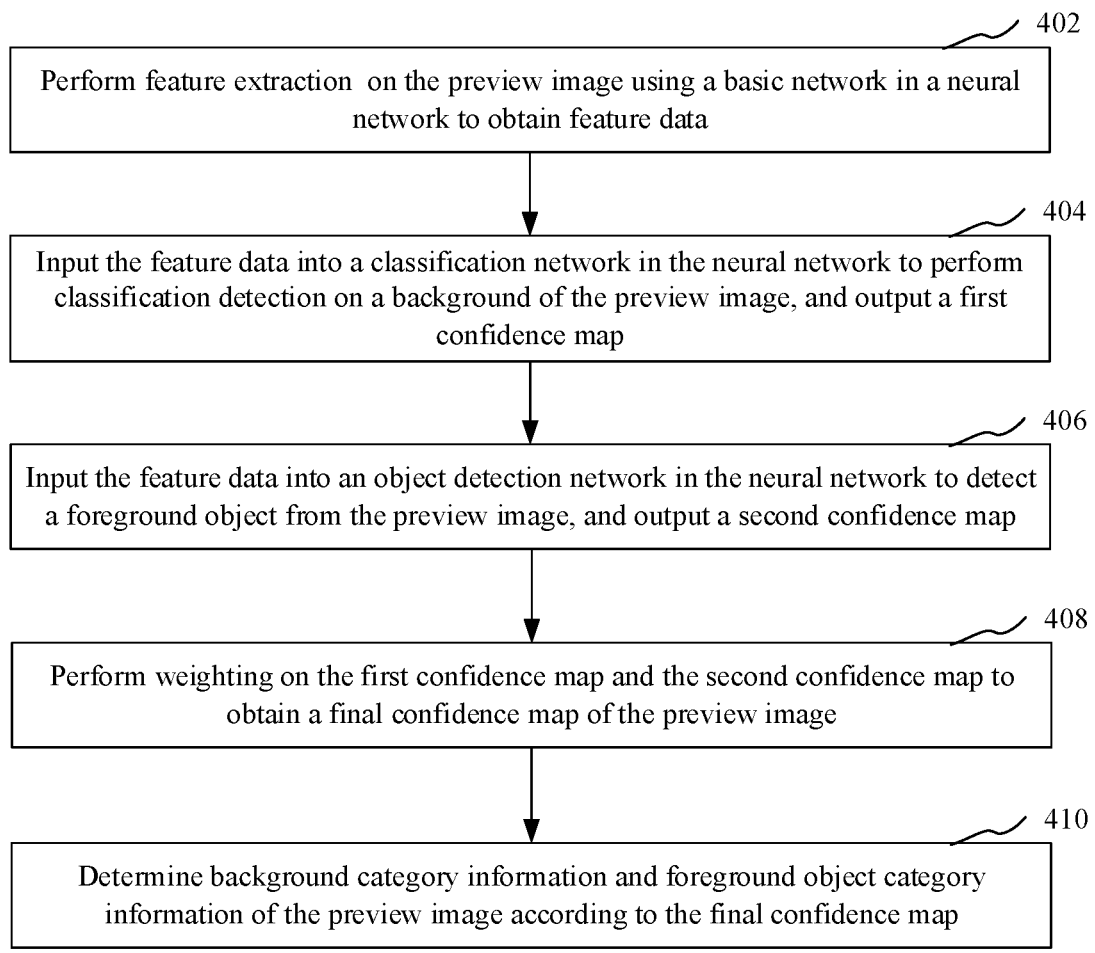
FIG. 4 illustrates a flowchart of a method for identifying scene information from a preview image based on a neural network according to an embodiment.

In an embodiment, the scene information includes background category information and foreground object category information. As illustrated in FIG. 4, the operation of identifying scene information from the preview image includes actions illustrated in blocks 402 to 410.

At block 402, feature extraction is performed on the preview image using a basic network in a neural network to obtain feature data.

At block 404, the feature data is input into a classification network in the neural network to perform classification detection on a background of the preview image, and a first confidence map is output. Each pixel in the first confidence map represents a degree of confidence that the pixel of the preview image belongs to a background of the preview image.

At block 406, the feature data is input into an object detection network in the neural network to detect a foreground object from the preview image, and a second confidence map is output. Each pixel in the second confidence map represents a degree of confidence that the pixel of the preview image belongs to a foreground object.

At block 408, weighting is performed on the first confidence map and the second confidence map to obtain a final confidence map of the preview image.

At block 410, background category information and foreground object category information of the preview image are determined according to the final confidence map.

Figure 5:
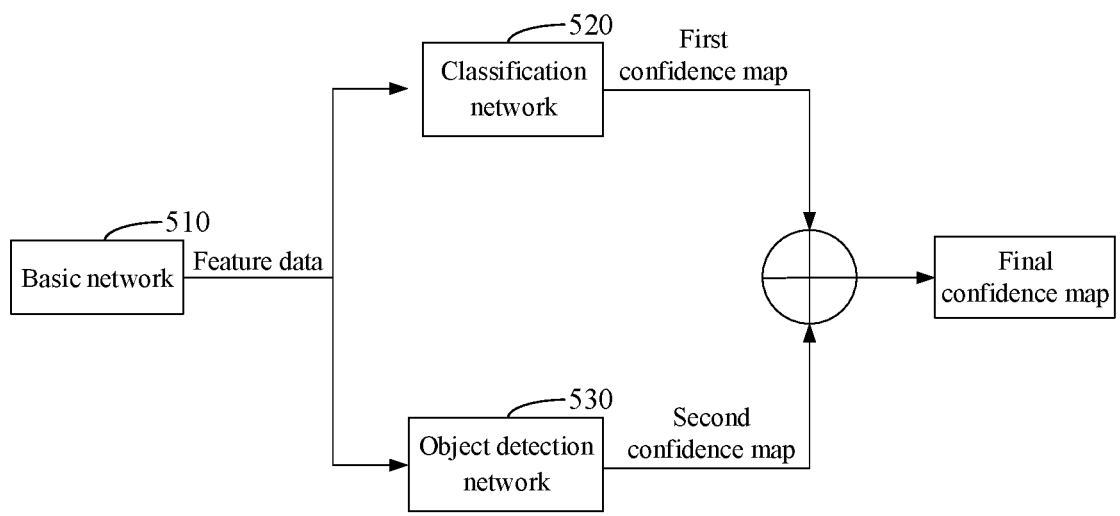
FIG. 5 illustrates an architecture diagram of a neural network according to another embodiment.

In the present embodiment, as illustrated in FIG. 5, the neural network includes a basic network 510, a classification network 520 and an object detection network 530. The basic network 510 extracts feature data of the preview image and inputs the feature data into the classification network 520 and the object detection network 530 respectively. The classification network 520 performs classification detection on a background of the preview image to obtain a first confidence map. The object detection network 530 detects a foreground object of the preview image to obtain a second confidence map. Weighting is performed on the first confidence map and the second confidence map to obtain a final confidence map of the preview image. Background category information and foreground object category information of the preview image are determined according to the final confidence map.

In statistics, a confidence interval of a probability sample is a type of interval estimate of a population parameter of the sample. The confidence interval illustrates that the extent to which the true value of the population parameter has a certain probability of falling around a measurement result. The confidence is the credibility of a measured value of the measured parameter.

Figure 6:
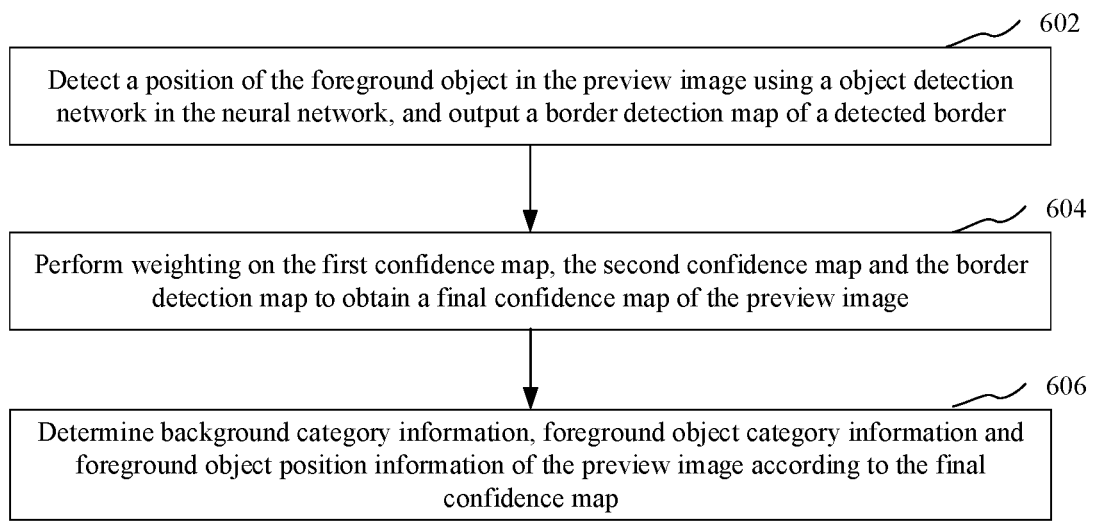
FIG. 6 illustrates a flowchart of a method for identifying scene information from a preview image based on a neural network according to another embodiment.

In an embodiment, the scene information further includes foreground object position information. Here, the foreground object position information may include information about a position of a foreground object, for example, a position of a foreground object in the preview image. As illustrated in FIG. 6, the operation of identifying scene information from the preview image includes actions illustrated in blocks 602 to 606.

At block 602, a position of a foreground object in the preview image is detected using an object detection network in the neural network, and a border detection map of a detected border is output. The border detection map of the detected border includes a vector for each pixel in the preview image. The vector represents a position of the corresponding pixel relative to the detected border. The detected border is a border of the foreground object detected in the preview image using the neural network.

At block 604, weighting is performed on the first confidence map, the second confidence map and the border detection map to obtain a final confidence map of the preview image.

At block 606, background category information, foreground object category information and foreground object position information of the preview image are determined according to the final confidence map.

Figure 7:
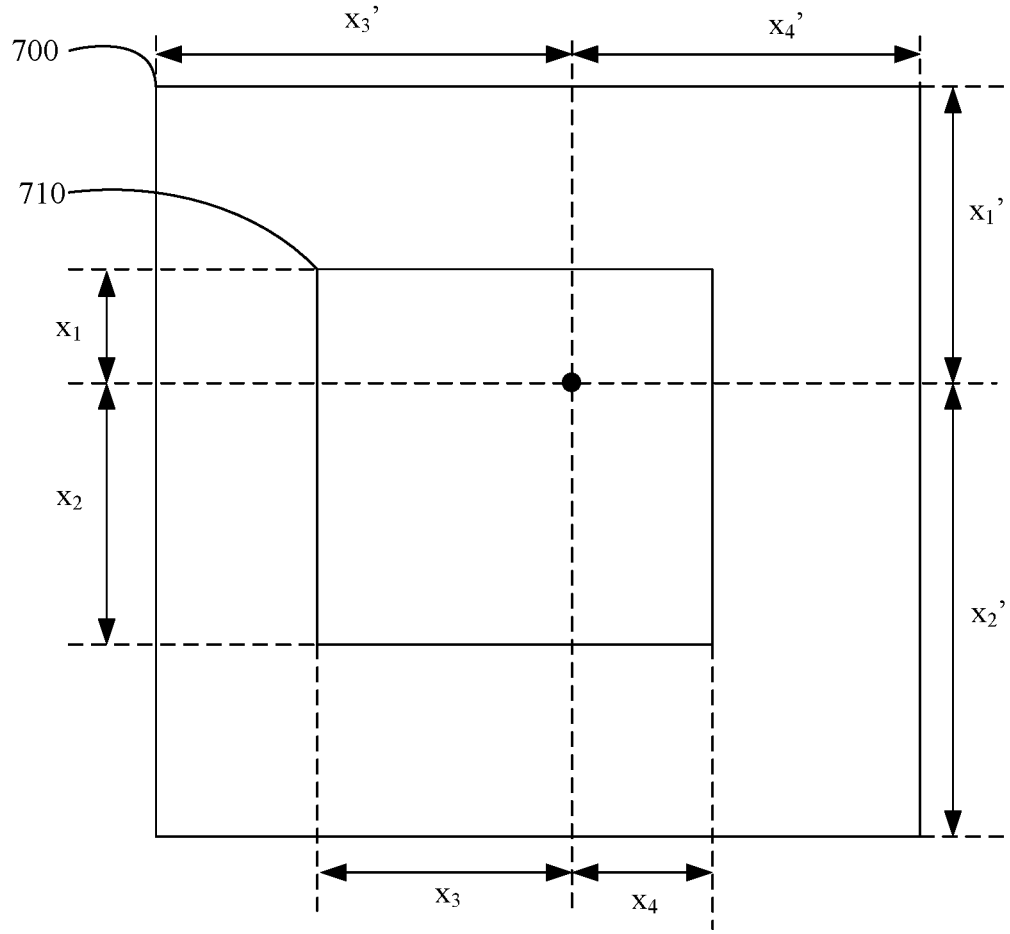
FIG. 7 illustrates a border diagram of a foreground object in a preview image according to one embodiment.

Specifically, as illustrated in FIG. 7, the border detection map 710 of the detected border includes a vector for each pixel in the detected border, and the vector represents a position of the corresponding pixel relative to the detected border. The vectors for the corresponding pixel in the border detection map 710 can be represented as a first four-dimensional vector and a second four-dimensional vector. The first four-dimensional vector is $x=(x_1, x_2, x_3, x_4)$, and elements in the first four-dimensional vector are respectively distances from the pixel to the upper, lower, left and right boundaries of the border detection map 710 of the detected border of the foreground object. The second four-dimensional vector is $x'=(x_1', x_2', x_3', x_4')$, and elements in the second four-dimensional vector are respectively distances from the pixel to the upper, lower, left and right boundaries of the border detection map 700 of a detected border of a preview image to which the pixel is located. It will be appreciated that the position of the foreground object in the preview image may be determined by detecting the second four-dimensional vectors for all the pixels of the border detection map 710. In an embodiment, the object detection network in the neural network detects a foreground object of the preview image, outputs the second confidence map and the border detection map 710. Weighting is performed on the first confidence map, the second confidence map and the border detection map 710 to obtain a final confidence map of the preview image. Background category information, foreground object category information and foreground object position information of the preview image may be determined based on the final confidence map. Further, the area of the detected border of the foreground object corresponding to the border detection map 710 is $X=(x_1+x_2)*(x_3+x_4)$. The border detection map 710 in the present embodiment is a rectangular block diagram. In other embodiments, the border detection map is a block diagram of an arbitrary shape, which is not specifically limited herein.

Figure 8:
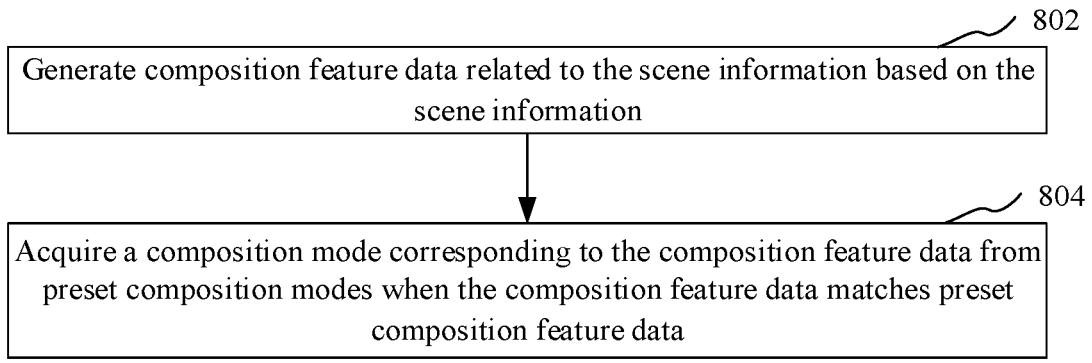
FIG. 8 illustrates a flowchart of a method of determining a composition mode for a preview image based on scene information according to an embodiment.

In an embodiment, as illustrated in FIG. 8, the operation of determining a composition mode corresponding to the scene information includes actions illustrated in blocks 802 to 804.

At block 802, composition feature data related to scene information is generated based on the scene information.

At block 804, a composition mode corresponding to the composition feature data is acquired from preset composition modes when the composition feature data matches preset composition feature data.

In an embodiment, the scene information includes background category information and foreground object category information. The composition feature data includes background category data, the size and location of a foreground object, a background environment, etc. Specifically, the computer device pre-stores a large number of preset composition modes, and each of the preset composition modes matches a respective one piece of preset composition feature data. A composition mode corresponding to composition feature data is acquired from the preset composition modes when the composition feature data matches preset composition feature data. For example, when the scene information of the preview image is landscape plus portrait, the composition feature data (such as the size and location of a portrait, and a category of the landscape) related to the scene information is generated. The generated composition feature data and the preset composition feature data stored in advance are compared, and when the generated composition feature data matches the preset composition feature data, the composition mode for the scene of landscape plus portrait corresponding to the composition feature data is acquired from the preset composition modes. Specifically, the computer device pre-stores a great number of excellent composition modes corresponding to different pieces of scene information (for example, landscape plus portrait). Each of the composition modes corresponds to a group of composition feature data. Therefore, the best composition mode for the preview image may be determined by comparing the composition feature data.

In an embodiment, the operation of determining a composition mode corresponding to the scene information includes that: a composition mode for the preview image is determined based on the background category information and the foreground object category information. Specifically, the computer device pre-stores at least one type of scene in the memory. The computer device calls the composition mode corresponding to a type of scene based on the type of the scene when the type of the scene is determined. For example, when the background category information is landscape and the foreground object category information is a portrait, that is, a scene type of landscape plus portrait, the corresponding composition mode is a nine-square lattice composition mode; and the composition processing result based on the scene information and the composition mode is: a position at one-third of the preview image is determined as the position of each portrait in a composition. When the background category information is landscape and the foreground object category information is food, that is, a scene type of landscape plus food, the corresponding composition mode is: a nine-square lattice composition mode; and the composition processing result based on the scene information and the composition mode is: the central position of the preview image is determined as the position of food in a composition.

Figure 9:
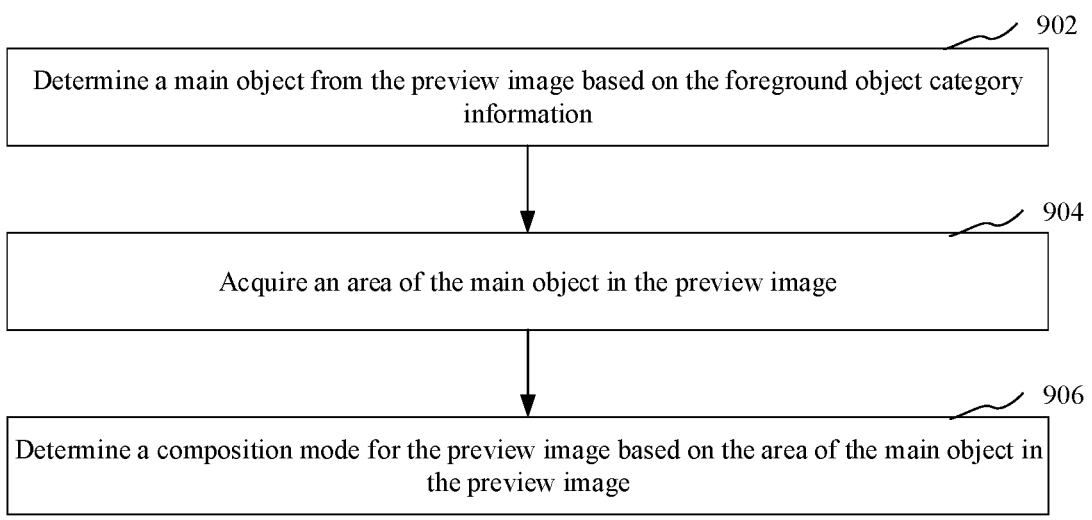
FIG. 9 illustrates a flowchart of a method of determining a composition mode for a preview image based on scene information according to another embodiment.

In an embodiment, as illustrated in FIG. 9, the scene information includes foreground object category information, and the operation of determining a composition mode corresponding to the scene information includes actions illustrated in blocks 902 to 906.

At block 902, a main object of the preview image is determined based on the foreground object category information.

At block 904, an area of the main object in the preview image is acquired.

At block 906, a composition mode for the preview image is determined based on the area of the main object in the preview image.

In the present embodiment, the category of the foreground object is detected using the object detection network in the neural network to determine a main object of the preview image. The border detection map of a detected border of the main object is output to acquire an area of the main object in the preview image. A position of the main object in a composed image is determined based on the area of the main object in the preview image. Specifically, referring to FIG. 7, the area of the main object may be determined based on the border detection map of the detected border of the main object. When the area of the main object is larger than a preset area, the preview image may be determined to be an image taken in close-range. The composition mode for the preview image may be determined at this time. For example, a triangular composition mode is adopted to arrange a main object at a center of the preview image to highlight the main object. In other embodiments, a tripartite composition mode may also be adopted, the main object is arranged at the golden section line of the preview image, and other foreground objects are arranged near the golden section line to make the preview image compact and powerful.

In an embodiment, the image processing method further includes that: the preview image is composed based on the scene information and the composition mode. Specifically, different pieces of scene information correspond to the same or different composition modes. The preview image may be composed based on the scene information and the composition mode. For example, when the scene information is landscape plus portrait (multiple), and the composition mode corresponding to the scene information is a nine-square lattice composition mode, the composition processing result based on the scene information and the composition mode is that a position at one-third of the preview image is determined as the position of each portrait in a composition. When the scene information is landscape plus food, and the corresponding composition mode is a nine-square lattice composition mode, the composition processing result based on the scene information and the composition mode is that the central position of the preview image is determined as the position of food in a composition.

Here, different composition modes corresponding to different pieces of scene information are pre-stored in the computer device, and the preview image is composed based on detected scene information and a composition mode corresponding to the detected scene information.

In an embodiment, the composition modes include a nine-square lattice composition, a cross-shaped composition, a triangular composition, a diagonal composition, etc.

Figure 10:
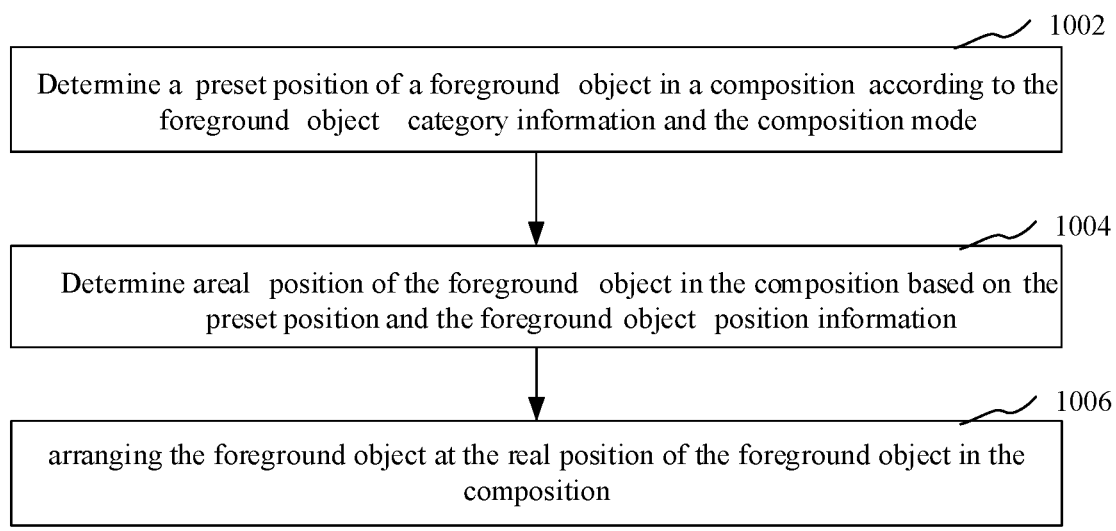
FIG. 10 illustrates a flowchart of a method of composing a preview image based on scene information and a composition mode according to an embodiment.

In an embodiment, as illustrated in FIG. 10, the scene information includes foreground object category information and foreground object position information, and the operation of composing the preview image based on the scene information and the composition mode includes actions illustrated in blocks 1002 to 1006.

At block 1002, a preset position of a foreground object in a composition is determined according to the foreground object category information and the composition mode.

At block 1004, a real position of the foreground object in the composition is determined based on the preset position and the foreground object position information.

At block 1006, the foreground object is arranged at the real position of the foreground object in the composition.

Specifically, preset positions are different for different foreground objects and composition modes. For example, when the foreground object category is a portrait, the preset position of the portrait may be at the one-third of an image according to the nine-square lattice composition mode; and when the foreground object category is food, the preset position of the food may be at the center of the image.

A real position of the foreground object in a composition may be determined based on the preset position in the composition and the foreground object position information. For example, the foreground object position information $(x_1', x_2', x_3', x_4')$ (see the second four-dimensional vector in FIG. 7) may be acquired based on the border detection map, the determined preset position of the foreground object is $(y_1', y_2', y_3', y_4')$, and the real position of the foreground object $(z_1', z_2', z_3', z_4')$ in the composition may be calculated according to the following formulas (1), (2), (3) and (4):

$$z_1' = (x_1' + y_1')/2; \quad (1)$$

$$z_2' = (x_2' + y_2')/2; \quad (2)$$

$$z_3' = (x_3' + y_3')/2; \quad (3)$$

$$z_4' = (x_4' + y_4')/2. \quad (4)$$

In the present embodiment, the real position of the foreground object in the composition is calculated based on the foreground object position information (the coordinate of the four-dimensional vector) and the preset position of the foreground object in the composition. Thus, the composition guiding schemes of different composition modes for different foreground objects are unified as a scheme, so that a photographer can learn and operate more easily, thereby improving the user experience.

Figure 11:
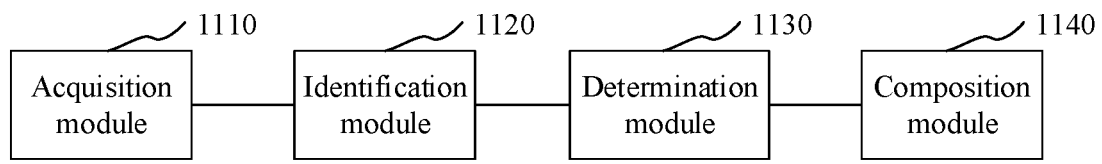
FIG. 11 illustrates a block diagram of an apparatus for processing an image according to an embodiment.

FIG. 11 illustrates a block diagram of an apparatus for processing an image according to an embodiment. As illustrated in FIG. 11, the image processing apparatus includes an acquisition module 1110, an identification module 1120, a determination module 1130 and a composition module 1140.

The acquisition module 1110 is configured to acquire a preview image to be processed.

The identification module 1120 is configured to identify scene information from the preview image.

The determination module 1130 is configured to determine a composition mode corresponding to the scene information.

The composition module 1140 is configured to compose the preview image according to the composition mode.

In the embodiments of the present disclosure, a preview image to be processed is acquired by the acquisition module 1110; scene information is identified from the preview image by the identification module 1120; a composition mode corresponding to the scene information is determined by the determination module 1130; and the preview image is composed by the composition module 1140 according to the composition mode. The scene information of the preview image can be automatically identified, and each piece of scene information can be matched automatically with a corresponding composition mode, so that subsequent shooting adjustment prompts for the preview image are provided based on different composition modes, and the processed image has a higher ornamental value.

In an embodiment, the identification module 1120 further includes a feature extraction unit, a classification unit, an object detection unit, a calculation unit and a first determination unit.

The feature extraction unit is configured to perform feature extraction on the preview image using a basic network in a neural network to obtain feature data.

The classification unit is configured to perform classification detection on a background of the preview image using a classification network in the neural network, and output a first confidence map. Each pixel in the first confidence map represents a degree of confidence that the pixel in the preview image belongs to the background of the preview image.

The object detection unit is configured to detect a foreground object of the preview image using an object detection network in the neural network, and output a second confidence map. Each pixel in the second confidence map represents a degree of confidence that the pixel in the preview image belongs to the foreground object.

The calculation unit is configured to perform weighting on the first confidence map and the second confidence map to obtain a final confidence map of the preview image.

The first determination unit is configured to determine background category information and foreground object category information of the preview image according to the final confidence map.

In an embodiment, the object detection unit further includes an object position detection sub-unit.

The object position detection sub-unit is configured to detect a position of a foreground object in the preview image using an object detection network in the neural network, and output a border detection map of a detected border. The border detection map includes a vector for each pixel in the preview image. The vector represents a position of the corresponding pixel relative to the detected border. The detected border is a border of the foreground object detected in the image to be detected using the neural network.

In an embodiment, the calculation unit is further configured to perform weighting on the first confidence map, the second confidence map and the border detection map to obtain a final confidence map of the preview image.

In an embodiment, the first determination unit is further configured to determine background category information, foreground object category information and foreground object position information of the preview image according to the final confidence map.

In an embodiment, the determination module 1130 further includes a generation unit and a second determination unit.

The generation unit is configured to generate composition feature data related to scene information based on the scene information.

The second determination unit is configured to acquire a composition mode corresponding to the composition feature data from preset composition modes when the composition feature data matches preset composition feature data.

In an embodiment, the determination module 1130 further includes a third determination unit.

The third determination unit is configured to determine a composition mode for the preview image based on the background category information and the foreground object category information.

In an embodiment, the determination module 1130 further includes a fourth determination unit, an area acquisition unit and a fifth determination unit.

The fourth determination unit is configured to determine a main object of the preview image based on the foreground object category information.

The area acquisition unit is configured to acquire an area of the main object in the preview image.

The fifth determination unit is configured to determine a composition mode for the preview image based on the area of the main object in the preview image.

In an embodiment, the composition module 1140 is further configured to compose a preview image according to scene information and a composition mode.

In an embodiment, the composition module 1140 further includes a sixth determination unit and a seventh determination unit.

The sixth determination unit is configured to determine a preset position of a foreground object in a composition according to the foreground object category information and the composition mode.

The seventh determination unit is configured to determine a real position of the foreground object in the composition based on the preset position and the foreground object position information.

Although various operations in the flowchart in FIG. 1, FIG. 4, FIG. 6, FIG. 8, FIGS. 9 and 10 are displayed in sequence according to the indication of an arrow, these operations are not necessarily performed in the sequence indicated by the arrow. Unless expressly stated herein, there is no strict sequence limitation to these operations, which may be performed in other sequences. Moreover, at least some operations in FIG. 1, FIG. 4, FIG. 6, FIG. 8, FIG. 9 and FIG. 10 may include multiple sub-operations or multiple stages. These sub-operations or stages are not necessarily completed at the same moment but may be performed at different moments, and these sub-operations or stages are not necessarily performed in a sequence but may be performed in turns or alternately with at least some of other operations or sub-operations or stages of the other operations.

The division of modules in the above image processing apparatus is only for illustration, and in other embodiments, the image processing apparatus may be divided into different modules as needed to complete all or some functions of the above image processing apparatus.

The embodiment of the present disclosure also provides a device for processing an image, which is located in a mobile terminal. The device for processing an image includes a processor, and a memory coupled to the processor. The processor is configured to: acquire a preview image to be processed; identify scene information from the preview image; determine a composition mode corresponding to the scene information; and compose the preview image according to the composition mode.

In some embodiments, the processor may be further configured to generate composition feature data related to the scene information based on the scene information; and acquire a composition mode corresponding to the composition feature data from preset composition modes when the composition feature data matches preset composition feature data.

In some embodiments, the scene information may include foreground object category information. Accordingly, the processor may be further configured to:

determine a main object from the preview image based on the foreground object category information; acquire an area of the main object in the preview image; and determine the composition mode for the preview image based on the area of the main object in the preview image.

In some embodiments, the scene information may include background category information and foreground object category information. Accordingly, the processor may be further configured to: determine a category of a background of the preview image based on the background category information; determine a category of a foreground object of the preview image based on the foreground object category information; and determine the composition mode for the preview image based on the category of the background of the preview image and the category of the foreground object of the preview image.

In some embodiments, the composition mode corresponding to the scene information may include a nine-square lattice composition mode and a triangular composition mode. Accordingly, the processor may be further configured to: determine a number of foreground objects of the preview image based on foreground object category information in the scene information; compose, responsive to determining that the number of the foreground objects of the preview image is equal to or greater than a threshold, the preview image according to the nine-square lattice composition mode; and compose, responsive to determining that the number of the foreground objects of the preview image is less than the threshold, the preview image according to the triangular composition mode.

In some embodiments, the scene information may include foreground object category information and foreground object position information. Accordingly, the processor may be configured to: determine a preset position of a foreground object in a composition according to the foreground object category information and the composition mode; determine a real position of the foreground object in the composition based on the preset position of the foreground object and the foreground object position information; and arrange the foreground object at the real position of the foreground object in the composition.

In some embodiments, the scene information may include background category information and foreground object category information. Accordingly, the processor may be configured to: perform feature extraction on the preview image using a basic network in a neural network to obtain feature data; input the feature data into a classification network in the neural network to perform classification detection on a background of the preview image, and output a first confidence map, wherein each pixel in the first confidence map represents a degree of confidence that the pixel in the preview image belongs to the background of the preview image; input the feature data into an object detection network in the neural network to detect a foreground object from the preview image, and output a second confidence map, wherein each pixel in the second confidence map represents a degree of confidence that the pixel in the preview image belongs to the foreground object; perform weighting on the first confidence map and the second confidence map to obtain a final confidence map of the preview image; and determine the background category information and the foreground object category information of the preview image according to the final confidence map.

In some embodiments, the scene information may further include foreground object position information. Accordingly, the processor may be configured to: detect a position of the foreground object in the preview image using the object detection network in the neural network, and output a border detection map of a detected border, wherein the border detection map of the detected border comprises a vector for each pixel in the preview image, the vector represents a position of the corresponding pixel relative to the detected border, and the detected border is a border of the foreground object detected in the preview image to be processed using the neural network; perform weighting on the first confidence map, the second confidence map and the border detection map to obtain the final confidence map of the preview image; and determine the background category information, the foreground object category information and the foreground object position information of the preview image based on the final confidence map.

The embodiment of the present disclosure also provides a mobile terminal. The mobile terminal includes a memory and a processor. The memory stores a computer program. When the computer program is executed by the processor, the processor is enabled to perform the operations of the image processing method.

The embodiment of the present disclosure also provides a computer-readable storage medium. A computer-readable storage medium has a computer program stored thereon, the computer program is executed by a processor to implement the operations of the image processing method.

Figure 12:
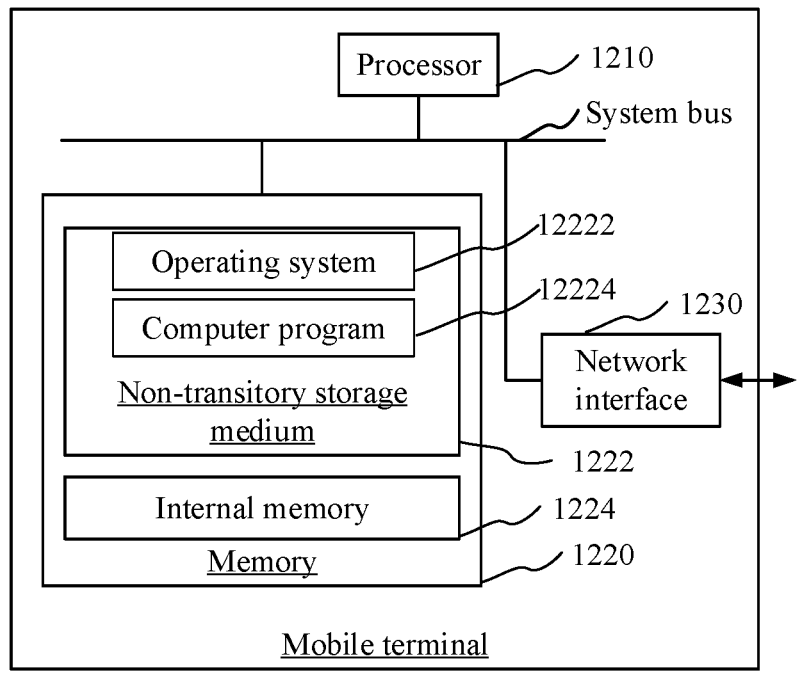
FIG. 12 illustrates an internal structure diagram of a mobile terminal according to an embodiment.

FIG. 12 illustrates an internal structure diagram of a mobile terminal according to an embodiment. As illustrated in FIG. 12, the mobile terminal includes a processor 1210, a memory 1220 and a network interface 1230, connected through a system bus. The processor 1210 is configured to provide computing and control capabilities for supporting the operation of the entire mobile terminal. The memory 1220 is configured to store data, programs, or the like. The memory 1220 stores at least one computer program 12224, and the computer program 12224 may be executed by the processor to implement a wireless network communication method applied to the mobile terminal provided in the embodiments of the present disclosure. The memory 1220 may include a non-transitory storage medium 1222 and an internal memory 1224. The non-transitory storage medium 1222 stores an operating system 12222 and a computer program 12224. The computer program 12224 may be executed by the processor 1210 to implement a neural network model processing method or image processing method provided in each of the above embodiments. The internal memory 1224 provides a cache operation environment for the operating system and the computer program in the non-transitory storage medium. The network interface 1230 may be an Ethernet card or a wireless network card for communicating with an external mobile terminal. The mobile terminal may be a mobile phone, a tablet, a personal digital assistant, a wearable device, or the like.

Figure 13:
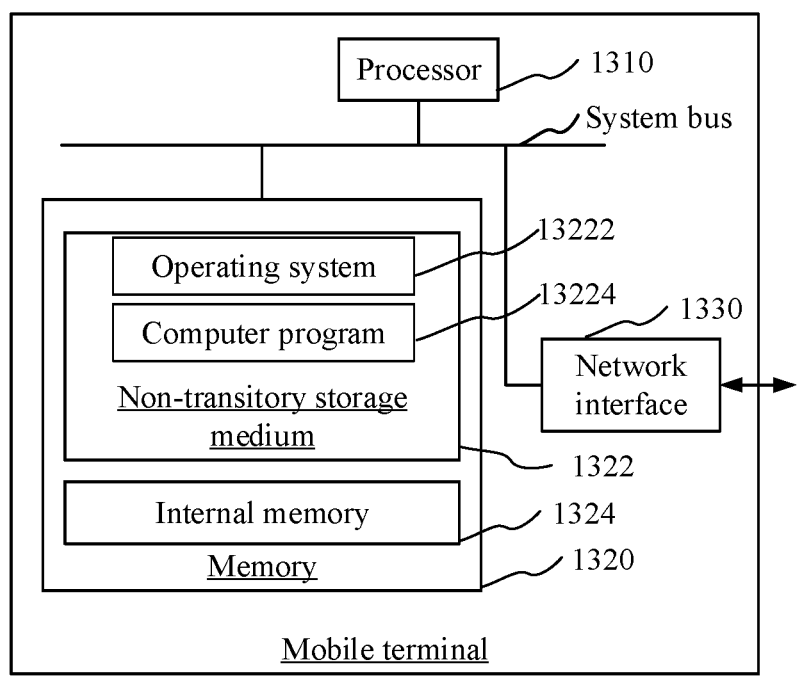
FIG. 13 illustrates an internal structure diagram of a server according to an embodiment.

FIG. 13 illustrates an internal structure diagram of a server (or a cloud, etc.) according to an embodiment. As illustrated in FIG. 13, the server includes a processor 1310, a non-transitory storage medium 1322, an internal memory 1324 and a network interface 1330, connected through a system bus. The processor 1310 is configured to provide computing and control capabilities for supporting the operation of the entire mobile terminal. The memory 1320 is configured to store data, programs, or the like. The memory 1320 stores at least one computer program 13224, and the computer program 13224 may be executed by the processor 1310 to implement a wireless network communication method applied to the mobile terminal provided in the embodiments of the present disclosure. The memory 1320 may include a non-transitory storage medium 1322 and an internal memory 1324. The non-transitory storage medium 1322 stores an operating system 13222 and a computer program 13224. The computer program 13224 may be executed by the processor 1310 to implement a neural network processing method or image processing method provided in each of the above embodiments. The internal memory provides a cache operation environment for the operating system and the computer program in the non-transitory storage medium. The network interface 1330 may be an Ethernet card or a wireless network card for communicating with an external mobile terminal. The server may be implemented with a stand-alone server or a server cluster consisting of multiple servers. A person skilled in the art may understand that the structure illustrated in FIG. 13 is only a partial structure block diagram associated with the solution of the disclosure, and is not limitative to the server to which the solution of the disclosure is applied. Specifically, the server may include parts more or fewer than those illustrated in the figure, or combine some parts, or have different part arrangements.

Each module in the neural network model processing apparatus or image processing apparatus provided in the embodiments of the present disclosure may be implemented in the form of a computer program. The computer program may operate on a mobile terminal or a server. A program module formed by the computer program may be stored on the memory of the mobile terminal or the server. The computer program is executed by a processor to implement the operations of the method described in the embodiments of the present disclosure.

A computer program product including an instruction is provided. When the computer program product operates on a computer, the computer is enabled to perform the neural network model processing method or image processing method.

Figure 14:
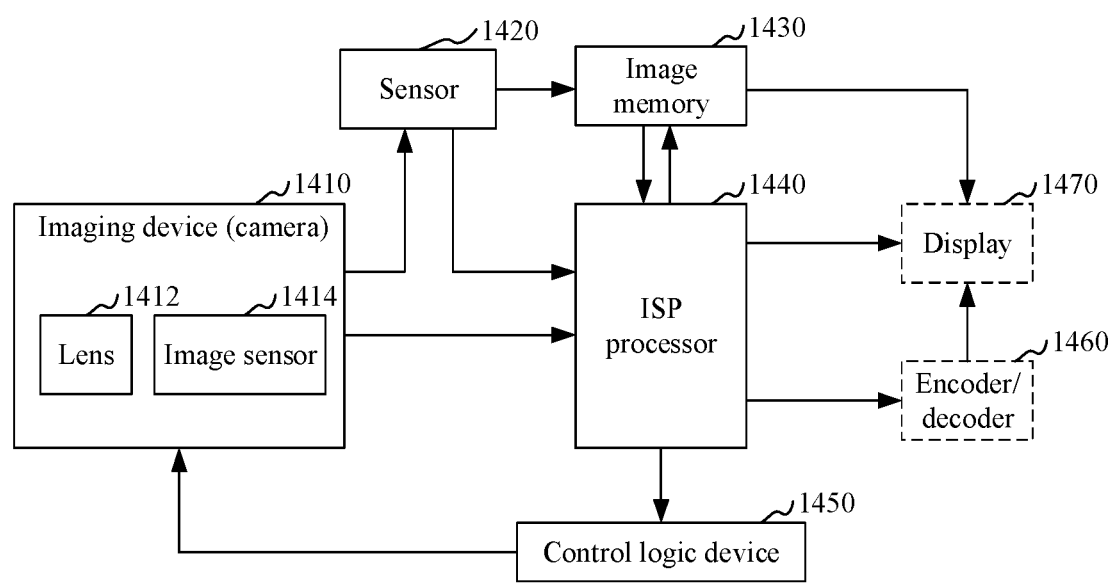
FIG. 14 illustrates a diagram of an image processing circuit according to an embodiment.

The embodiment of the present disclosure also provides a mobile terminal. The mobile terminal includes an image processing circuit. The image processing circuit may be implemented through hardware and/or software components, and may include various processing units defining an image signal processing (ISP) pipeline. FIG. 14 illustrates a diagram of an image processing circuit according to an embodiment. As illustrated in FIG. 14, for convenience of explanation, only various aspects of the image processing technology related to the embodiments of the present disclosure are illustrated.

As illustrated in FIG. 14, the image processing circuit includes an ISP processor 1440 and a control logic device 1450. Image data captured by an imaging device 1410 is first processed by the ISP processor 1440, and the ISP processor 1440 analyzes the image data to capture image statistics information that can be used to determine one or more control parameters of the imaging device 1410. The imaging device 1410 may include a camera having one or more lenses 1412 and image sensors 1414. The image sensor 1414 may include a color filter array (for example, Bayer filter). The image sensor 1414 may acquire light intensity and wavelength information captured by each of the imaging pixels in the image sensor 1414 and provide a set of original image data that can be processed by the ISP processor 1440. A sensor 1420 (for example, a gyroscope) may provide captured image processing parameters (for example, anti-shake parameters) for the ISP processor 1440 based on a sensor 1420 interface type. The sensor 1420 interface may be a standard mobile imaging architecture (SMIA) interface, another serial or parallel camera interface, or a combination of the above interfaces.

In addition, the image sensor 1414 may also send original image data to the sensor 1420. The sensor 1420 may provide the original image data for the ISP processor 1440 based on the sensor 1420 interface type, or the sensor 1420 may store the original image data into an image memory 1430.

The ISP processor 1440 processes the original image data pixel by pixel in a variety of formats. For example, each image pixel may have a bit depth of 8, 10, 12, or 14 bits. The ISP processor 1440 may perform one or more image processing operations on the original image data, and may collect statistical information about the image data. The image processing operations may be performed according to the same or different bit depths.

The ISP processor 1440 may also receive image data from the image memory 1430. For example, the sensor 1420 interface sends the original image data to the image memory 1430, and the original image data in the image memory 1430 is then provided for the ISP processor 1440 for processing. The image memory 1430 may be part of a memory apparatus, a storage device, or a separate dedicated memory within a mobile terminal, and may include direct memory access (DMA) features.

In response to receiving the original image data from the image sensor 1414 interface or from the sensor 1420 interface or from the image memory 1430, the ISP processor 1440 may perform one or more image processing operations, such as time domain filtering. The processed image data may be sent to the image memory 1430 for additional processing prior to being displayed. The ISP processor 1440 receives processed data from the image memory 1430 and performs image data processing on the processed data in an original domain and in RGB and YCbCr color spaces. The image data processed by the ISP processor 1440 may be output to a display 1470, so as to be viewed by a user and/or further processed by a graphics engine or a graphics processing unit (GPU). Additionally, the data output by the ISP processor 1440 may also be sent to the image memory 1430, and the display 1470 may read image data from the image memory 1430. In an embodiment, the image memory 1430 may be configured to implement one or more frame buffers. Additionally, the data output by the ISP processor 1440 may be sent to an encoder/decoder 1460 to encode/decode image data. The encoded image data may be saved and decompressed before being displayed on the display 1470 device. The encoder/decoder 1460 may be implemented by a CPU or GPU or coprocessor.

Statistical data determined by the ISP processor 1440 may be sent to a control logic device 1450. For example, the statistical data may include image sensor 1414 statistical information such as auto exposure, auto white balance, auto focus, flicker detection, black level compensation, second lens 1412 shading correction. The control logic device 1450 may include a processor and/or a micro controller that executes one or more routines (such as firmware). The one or more routines may determine control parameters of the imaging device 1410 and control parameters of the ISP processor 1440 according to the received statistical data. For example, the control parameters of the imaging device 1410 may include sensor 1420 control parameters (such as gain, integration time of exposure control, and anti-shake parameters), camera flash control parameters, lens 1412 control parameters (such as focus or zoom focal length), or a combination of these parameters, etc. The control parameters of the ISP processor may include a gain level and color correction matrix for automatic white balance and color adjustment (e.g., during RGB processing), and shading correction parameters of the lens 1412.

In some embodiments, the image processing circuit may be configured to: generate composition feature data related to the scene information based on the scene information; and acquire a composition mode corresponding to the composition feature data from preset composition modes when the composition feature data matches preset composition feature data.

In some embodiments, the scene information may include foreground object category information. Accordingly, the image processing circuit may be configured to: determine a main object from the preview image based on the foreground object category information; acquire an area of the main object in the preview image; and determine the composition mode for the preview image based on the area of the main object in the preview image.

Any reference used in the present disclosure to a memory, storage, a database or other media may include non-transitory and/or transitory memories. The appropriate non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM), used as an external cache memory. As being illustrative instead of being limitative, the RAM may be obtained in multiple forms such as a static RAM (SRAM), a dynamic RAM (DRAM), a synchronous DRAM (SDRAM), a dual data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The above embodiments only describe several implementations of the present disclosure more specifically and in more detail, but cannot be thus understood as limitation to the scope of the present disclosure. Those of ordinary skill in the art may also make several variations and improvements without departing from the concept of the present disclosure. These variations and improvements fall within the protection scope of the present disclosure. Therefore, the protection scope of the present disclosure should be determined by the appended claims.

The invention claimed is:

1. A method for processing an image, executed by a mobile terminal, the method comprising:
acquiring a preview image to be processed;
identifying scene information from the preview image;
determining a composition mode corresponding to the scene information; and
composing the preview image according to the composition mode,
wherein determining the composition mode corresponding to the scene information comprises:
generating composition feature data related to the scene information based on the scene information;

comparing the generated composition feature data with preset composition feature data; and acquiring a composition mode corresponding to the generated composition feature data from preset composition modes when the generated composition feature data matches the preset composition feature data, wherein when the generated composition feature data corresponds to a plurality of composition modes, an optimum composition mode is selected from the plurality of composition modes based on a number of foreground objects;

wherein the composition mode corresponding to the scene information comprises a nine-square lattice composition mode and a triangular composition mode, and wherein composing the preview image according to the composition mode comprises:

determining a number of foreground objects of the preview image based on foreground object category information in the scene information;

composing, responsive to determining that the number of the foreground objects of the preview image is equal to or greater than a threshold, the preview image according to the nine-square lattice composition mode; and composing, responsive to determining that the number of the foreground objects of the preview image is less than the threshold, the preview image according to the triangular composition mode.

2. The method of claim 1, wherein the scene information comprises foreground object category information, and wherein determining the composition mode corresponding to the scene information comprises:

determining a main object from the preview image based on the foreground object category information;

acquiring an area of the main object in the preview image; and determining the composition mode for the preview image based on the area of the main object in the preview image.

3. The method of claim 1, wherein the scene information comprises background category information and foreground object category information, and wherein determining the composition mode corresponding to the scene information comprises:

determining a category of a background of the preview image based on the background category information;

determining a category of a foreground object of the preview image based on the foreground object category information; and determining the composition mode for the preview image based on the category of the background of the preview image and the category of the foreground object of the preview image.

4. The method of claim 1, wherein the scene information comprises foreground object category information and foreground object position information, and wherein composing the preview image according to the composition mode comprises:

determining a preset position of a foreground object in a composition according to the foreground object category information and the composition mode;

determining a real position of the foreground object in the composition based on the preset position of the foreground object and the foreground object position information; and arranging the foreground object at the real position of the foreground object in the composition.

5. The method of claim 3, wherein the scene information comprises background category information and foreground object category information, and wherein identifying the scene information from the preview image comprises:

performing feature extraction on the preview image using a basic network in a neural network to obtain feature data;

inputting the feature data into a classification network in the neural network to perform classification detection on a background of the preview image, and outputting a first confidence map, wherein each pixel in the first confidence map represents a degree of confidence that the pixel in the preview image belongs to the background of the preview image;

inputting the feature data into an object detection network in the neural network to detect a foreground object from the preview image, and outputting a second confidence map, wherein each pixel in the second confidence map represents a degree of confidence that the pixel in the preview image belongs to the foreground object;

performing weighting on the first confidence map and the second confidence map to obtain a final confidence map of the preview image; and determining the background category information and the foreground object category information of the preview image according to the final confidence map.

6. The method of claim 5, wherein the scene information further comprises foreground object position information, and wherein identifying the scene information from the preview image further comprises:

detecting a position of the foreground object in the preview image using the object detection network in the neural network, and outputting a border detection map of a detected border, wherein the border detection map of the detected border comprises a vector for each pixel in the preview image, the vector represents a position of the corresponding pixel relative to the detected border, and the detected border is a border of the foreground object detected in the preview image to be processed using the neural network;

performing weighting on the first confidence map, the second confidence map and the border detection map to obtain the final confidence map of the preview image; and determining the background category information, the foreground object category information and the foreground object position information of the preview image based on the final confidence map.

7. The method of claim 1, wherein the composition mode comprises at least two of the following: a nine-square lattice composition, a cross-shaped composition, a triangular composition, or a diagonal composition.

8. A device for processing an image, comprising:
a processor, and
a memory coupled to the processor,
wherein the processor is configured to:
acquire a preview image to be processed;
identify scene information from the preview image;
determine a composition mode corresponding to the scene information; and
compose the preview image according to the composition mode, wherein the processor is specifically configured to:
generate composition feature data related to the scene information based on the scene information;
compare the generated composition feature data with preset composition feature data; and
acquire a composition mode corresponding to the generated composition feature data from preset composition modes when the generated composition feature data matches the preset composition feature data, wherein when the generated composition feature data corresponds to a plurality of composition modes, an optimum composition mode is selected from the plurality of composition modes based on a number of foreground objects;
wherein the composition mode corresponding to the scene information comprises a nine-square lattice composition mode and a triangular composition mode, and
wherein the processor is further configured to:
determine a number of foreground objects of the preview image based on foreground object category information in the scene information;
compose, responsive to determining that the number of the foreground objects of the preview image is equal to greater than a threshold, the preview image according to the nine-square lattice composition mode; and
compose, responsive to determining that the number of the foreground objects of the preview image is less than the threshold, the preview image according to the triangular composition mode.

9. The device of claim 8, wherein the scene information comprises foreground object category information, and
wherein the processor is further configured to:
determine a main object from the preview image based on the foreground object category information;
acquire an area of the main object in the preview image; and
determine the composition mode for the preview image based on the area of the main object in the preview image.

10. The device of claim 8, wherein the scene information comprises background category information and foreground object category information, and
wherein the processor is further configured to:
determine a category of a background of the preview image based on the background category information;
determine a category of a foreground object of the preview image based on the foreground object category information; and
determine the composition mode for the preview image based on the category of the background of the preview image and the category of the foreground object of the preview image.

11. The device of claim 8, wherein the scene information comprises foreground object category information and foreground object position information, and
wherein the processor is configured to:
determine a preset position of a foreground object in a composition according to the foreground object category information and the composition mode;
determine a real position of the foreground object in the composition based on the preset position of the foreground object and the foreground object position information; and
arrange the foreground object at the real position of the foreground object in the composition.

12. The device of claim 10, wherein the scene information comprises background category information and foreground object category information, and
wherein the processor is configured to:
perform feature extraction on the preview image using a basic network in a neural network to obtain feature data;
input the feature data into a classification network in the neural network to perform classification detection on a background of the preview image, and output a first confidence map, wherein each pixel in the first confidence map represents a degree of confidence that the pixel in the preview image belongs to the background of the preview image;
input the feature data into an object detection network in the neural network to detect a foreground object from the preview image, and output a second confidence map, wherein each pixel in the second confidence map represents a degree of confidence that the pixel in the preview image belongs to the foreground object;
perform weighting on the first confidence map and the second confidence map to obtain a final confidence map of the preview image; and
determine the background category information and the foreground object category information of the preview image according to the final confidence map.

13. The device of claim 12, wherein the scene information further comprises foreground object position information, and
wherein the processor is configured to:
detect a position of the foreground object in the preview image using the object detection network in the neural network, and output a border detection map of a detected border, wherein the border detection map of the detected border comprises a vector for each pixel in the preview image, the vector represents a position of the corresponding pixel relative to the detected border, and the detected border is a border of the foreground object detected in the preview image to be processed using the neural network;
perform weighting on the first confidence map, the second confidence map and the border detection map to obtain the final confidence map of the preview image; and
determine the background category information, the foreground object category information and the foreground object position information of the preview image based on the final confidence map.

14. A mobile terminal, comprising an imaging device, an image processing circuit and a display, wherein
the imaging device is configured to acquire a preview image to be processed and send the preview image to be processed to the image processing circuit;
the image processing circuit is configured to:
receive the preview image to be processed from the imaging device;
identify scene information from the preview image;
determine a composition mode corresponding to the scene information;
compose the preview image according to the composition mode; and
send the composed preview image to the display; and
the display is configured to display the composed preview image,
wherein the image processing circuit is specifically configured to:
generate composition feature data related to the scene information based on the scene information;

compare the generated composition feature data with preset composition feature data; and acquire a composition mode corresponding to the generated composition feature data from preset composition modes when the generated composition feature data matches the preset composition feature data, wherein when the generated composition feature data corresponds to a plurality of composition modes, an optimum composition mode is selected from the plurality of composition modes based on a number of foreground objects;

wherein the composition mode corresponding to the scene information comprises a nine-square lattice composition mode and a triangular composition mode, and wherein the image processing circuit is specifically configured to:

determine a number of foreground objects of the preview image based on foreground object category information in the scene information;

compose, responsive to determining that the number of the foreground objects of the preview image is equal to or greater than a threshold, the preview image according to the nine-square lattice composition mode; and compose, responsive to determining that the number of the foreground objects of the preview image is less than the threshold, the preview image according to the triangular composition mode.

15. The mobile terminal of claim 14, wherein the scene information comprises foreground object category information, and wherein the image processing circuit is further configured to:

determine a main object from the preview image based on the foreground object category information;

acquire an area of the main object in the preview image; and determine the composition mode for the preview image based on the area of the main object in the preview image.

* * * * *